United States Patent
Gong et al.

(10) Patent No.: US 10,462,078 B2
(45) Date of Patent: Oct. 29, 2019

(54) USING SIGNALS EXTRACTED FROM A VOIP DATA STREAM TO DISTINGUISH BETWEEN NETWORK CONGESTION AND LINK LOSSES

(71) Applicant: WhatsApp Inc., Menlo Park, CA (US)

(72) Inventors: Jun Gong, Mountain View, CA (US); Manpreet Singh, Los Altos Hills, CA (US)

(73) Assignee: WhatsApp Inc., Menlo Park, CA (US)

( * ) Notice: Subject to any disclaimer, the term of this patent is extended or adjusted under 35 U.S.C. 154(b) by 50 days.

(21) Appl. No.: 15/817,048

(22) Filed: Nov. 17, 2017

(65) Prior Publication Data

US 2019/0158437 A1     May 23, 2019

(51) Int. Cl.
*H04L 12/58* (2006.01)
*H04L 12/801* (2013.01)
*H04L 12/841* (2013.01)
*H04L 12/18* (2006.01)

(52) U.S. Cl.
CPC .............. *H04L 51/04* (2013.01); *H04L 47/11* (2013.01); *H04L 47/12* (2013.01); *H04L 47/14* (2013.01); *H04L 47/283* (2013.01); *H04L 12/1813* (2013.01)

(58) Field of Classification Search
None
See application file for complete search history.

(56) References Cited

U.S. PATENT DOCUMENTS

| | | | | |
|---|---|---|---|---|
| 7,496,040 | B2* | 2/2009 | Seo | H04L 1/0002 370/238 |
| 2002/0177910 | A1* | 11/2002 | Quarterman | H04L 43/50 700/28 |
| 2004/0233923 | A1* | 11/2004 | Fally | H04L 12/462 370/412 |
| 2008/0219281 | A1* | 9/2008 | Akin | G06F 15/16 370/419 |
| 2010/0246398 | A1* | 9/2010 | Chiang | H04L 43/0829 370/235 |
| 2011/0199895 | A1* | 8/2011 | Kanode | H04L 63/0892 370/225 |
| 2013/0094366 | A1* | 4/2013 | Lee | H04L 41/14 370/241 |
| 2015/0189542 | A1* | 7/2015 | Cazanas | H04W 28/0289 370/312 |
| 2015/0230274 | A1* | 8/2015 | Sharma | H04W 76/12 370/329 |
| 2016/0135079 | A1* | 5/2016 | Synnergren | H04W 28/10 370/230 |

(Continued)

*Primary Examiner* — Jeffrey M Rutkowski
*Assistant Examiner* — Andre Tacdiran
(74) *Attorney, Agent, or Firm* — Fenwick & West LLP

(57) ABSTRACT

Two (or more) client devices engage in a chat session. Packets associated with the chat session are numbered using a predetermined pattern. When the packets are received, the receiving client device extracts signals from the packet metadata to determine whether the primary cause of packet loss during transit is network congestion or link losses. Based on the extracted signals, the receiving device sends a control message back to the other client device indicating how one or more chat parameters should be updated. On receiving the control message, the other client device updates the chat parameters accordingly.

20 Claims, 8 Drawing Sheets

(56) References Cited

U.S. PATENT DOCUMENTS

| | | | |
|---|---|---|---|
| 2017/0013547 A1* | 1/2017 | Skaaksrud | H04W 4/80 |
| 2017/0104654 A1* | 4/2017 | Lan | H04L 43/0835 |
| 2017/0127358 A1* | 5/2017 | Jain | H04W 52/225 |
| 2017/0201439 A1* | 7/2017 | Yang | H04L 5/006 |
| 2018/0054772 A1* | 2/2018 | Tan | H04W 76/10 |
| 2019/0052565 A1* | 2/2019 | Modi | H04L 47/11 |

* cited by examiner

USING SIGNALS EXTRACTED FROM A VOIP DATA STREAM TO DISTINGUISH BETWEEN NETWORK CONGESTION AND LINK LOSSES

BACKGROUND

1. Technical Field

The subject matter described generally relates to internet chat protocols, and in particular to distinguishing between packet loss due to network congestion and link losses.

2. Background Information

People use applications (apps) on their mobile devices to engage in audio and video chats. These apps typically use Voice over Internet Protocol (VOIP) where the data for the chat are sent via Internet Protocol (IP) packets. Video chats in particular use a lot of data. If bandwidth is limited between the devices engaged in a chat, network congestion can occur, resulting in packet loss.

Another type of packet loss is referred to as a link loss. People often engage in VOIP sessions using wireless network connections, such as Wi-Fi, 3G, 4G, and the like. With such connections, the signal strength varies depending on the location of the user, the location of the connection point, and various factors that can cause interference (e.g., physical obstructions, other wireless signals, and the like). When the signal strength is weak, packets can be lost if they became too distorted before receipt for the receiving device to correctly interpret them.

Packet losses due to the above (and other) factors can impact the quality of the chat. These difficulties can be particularly pertinent when the chats are made using mobile devices. The devices may move among various data networks, and quality of a given network connection may change as the device moves. Thus, the amount and causes of packet loss may be in frequent flux, which can detract from the quality of the chat.

SUMMARY

People engage in video chats using various devices. Increasingly, the devices used are mobile devices and are connected to a wireless network. This can lead to an increase in network connectivity and reliability problems as compared to wired networks. Such problems can degrade the quality of the chats, negatively impacting user experience. These network problems are generally caused by either network congestion or a weak signal resulting in link losses.

In various embodiments, a device engaged in a chat session receives packets with chat data over the network. These packets also include metadata, such as a packet number. The packet numbers are assigned by the sending device using a predetermined pattern (e.g., consecutive numbering) such that the receiving device can identify when packets are missing, and which ones.

The receiving device extracts network performance signals from the metadata of the received packets to distinguish between network problems that are due to network congestion and network problems that are due to link losses. In one embodiment, three signals are used: a moving average signal, which compares short-term and long-term averages of packet relative one-way trip time (ROTT), a packet loss gap signal, which looks at the average size of groups of consecutive packets that are missing, and an overall latency signal, which compares the current ROTT for packets to a global minimum and maximum for the chat session.

Based on the extracted signals, the receiving device determines a control message to send indicating how one or more parameters of the chat session should be changed. For example, if the signals indicate network congestion, the control message might indicate that the chat bitrate should be reduced. As another example, if the signals indicate a significant amount of link loss, the control message might indicate that packet redundancy should be increased. The receiving device sends the control message to the sending device, which can take corrective action accordingly.

The Figures (FIGS.) and the following description describe certain embodiments by way of illustration only. One skilled in the art will readily recognize from the following description that alternative embodiments of the structures and methods may be employed without departing from the principles described.

DETAILED DESCRIPTION

People use apps on their mobile devices to engage in chat sessions, such as video chats. These apps typically use VOIP protocols where the video and audio data for the chat are sent via IP packets over a network. Packet losses negatively impact the quality of the chat session. The devices may move among various data networks, and quality of a given network connection may change as the device moves. Thus, the amount and cause of packet losses in transit can be in constant flux. Generally, packet losses can be categorized as being one of two types: network congestion and link losses.

Network congestion arises when the network bandwidth decreases (or the demands on the network increase). Network congestion causes the buffers in routers (and, potentially, other network components) to overflow. When this happens, the router can stop accepting new packets, resulting in them being lost. This can be addressed by decreasing the video bit rate and therefore sending less data (thus alleviating the congestion).

In contrast, with link losses, a poor connection to the network (e.g., due to a mobile device being on the edge of the region covered by a Wi-Fi hotspot) results in packets being lost. Thus, the receiving device is receiving less data. This can be addressed by increasing the redundancy of the sent packets (e.g., by sending redundant error-correct packets). This increases the bandwidth requirements of the chat session, which can result in network congestion. In other words, the solutions to packet loss due to congestion and link losses are often in conflict with each other.

Differentiating between these two conditions enables the devices to respond appropriately. Signals can be extracted from the received packets associated with a chat session to determine the severity of packet loss and distinguish between congestion and link losses. For example, network congestion generally increases ROTT while link losses do not, so a relatively rapid increase in ROTT can indicate the onset of network congestion. As another example, network congestion often results in groups of consecutive packets being lost while link losses are substantially randomly distributed. Thus, the distribution of lost packets can help distinguish between the two types of packet loss. Once the primary cause of current packet losses is determined, appropriate corrective action can be taken.

Reference will now be made to several embodiments, examples of which are illustrated in the accompanying figures. It is noted that wherever practicable similar or like reference numbers are used in the figures to indicate similar or like functionality.

System Architecture

Figure 1:
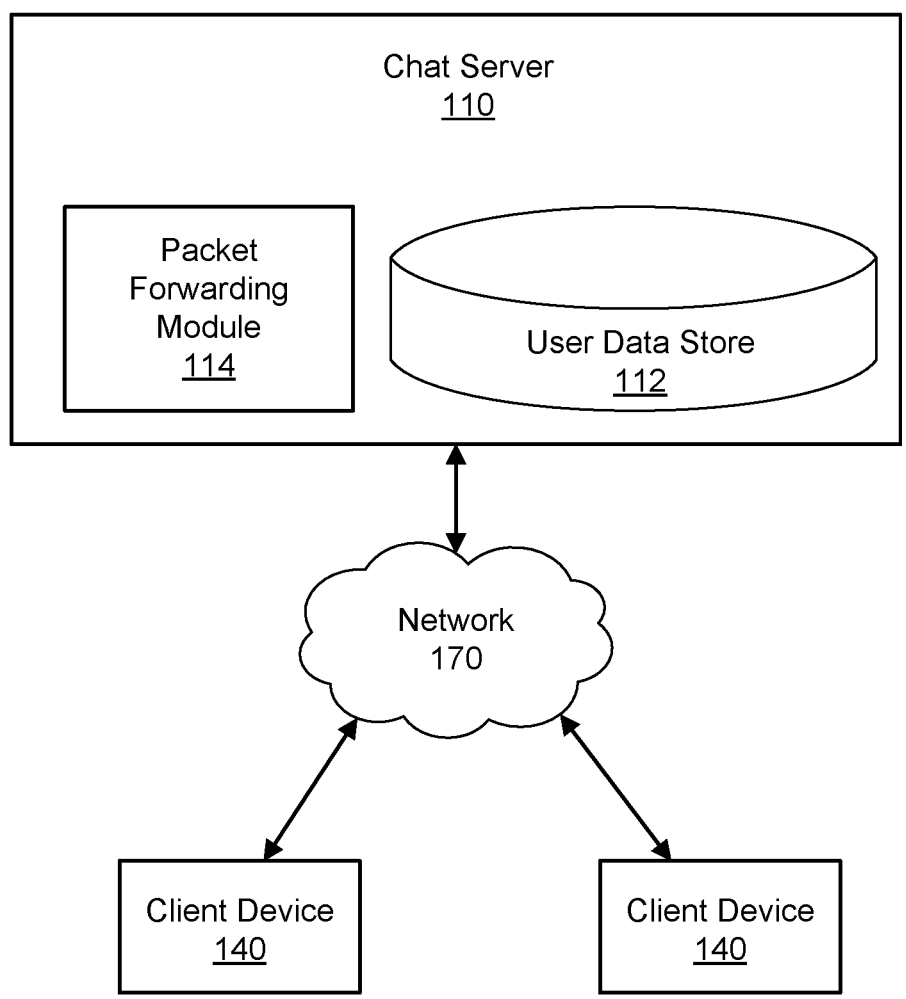
FIG. 1 is a high-level block diagram illustrating a system environment suitable for providing a chat service, according to one embodiment.

FIG. 1 illustrates one embodiment of a system environment 100 for providing an online chat service. The system environment 100 shown in FIG. 1 includes a pair of client devices 140 and a chat server 110, which are connected via a network 170. Although only two client devices 140 are shown, in practice, many more (e.g., thousands or even millions of) client devices may be connected to the network 170 at any given time. In alternative configurations, different and/or additional components may be included in the system environment 100. In addition, the functions may be distributed among the elements in a different manner than described. For example, in some embodiments, the chat server 110 is not included and the client devices 140 communicate directly using a peer-to-peer (P2P) protocol.

The client devices 140 are computing devices capable of receiving user input as well as transmitting and/or receiving data via the network 170. The client devices 140 can take various forms such as desktop computers, laptop computers, personal digital assistants (PDAs), mobile telephones, smartphones, and other suitable devices. In one embodiment, a client device 140 executes an application allowing a user of the client device to initiate and participate in chat sessions with one or more other client devices.

A chat session involves the transfer of chat data (e.g., video data, audio data, text data, etc.) from a sending client device 140 to one or more receiving client devices, where it is presented to a user substantially in real-time relative to the transfer. In various embodiments, the chat data is transferred in a series of sequential packets. The packets are assigned sequential numbers selected using a predetermined pattern that enables the receiving client device 140 to determine the sequential position of a packet relative to other packets (i.e., whether one packet comes before or after another and how many packets should be in between). Thus, the client device 140 can determine when packets are missing from what it receives via the network 170. In one embodiment, the packets are numbered consecutively. In other embodiments, different patterns are used to number the packets, such as using every other number, multiples of three, and the like.

Regardless of the specific pattern used, it may be repeated over a range of possible values. For example, the sending client device 140 might number packets consecutively from 0 to 65535 and then start again at 0.

The packets can either be transferred directly between the client devices 140 over the network 170 (e.g., using a P2P protocol) or sent via the chat server 110. Typically, all of the client devices 140 in a chat session will be both sending and receiving devices, although, in some embodiments, one-way chat sessions are possible. In a one-way chat session, chat data is sent by one client device 140 and presented by one or more receiving devices, but chat data is not transferred back to the sending device. The client devices 140 and chat sessions are described in greater detail below, with reference to FIGS. 2 and 3.

Where included, the chat server 110 mediates the chat session between the client devices. In the embodiment shown in FIG. 1, the chat server includes a packet forwarding module 114 and a user data store 112. In other embodiments, the chat server includes different and/or additional components.

The user data store 112 is one or more computer-readable media that store profiles of the users of the chat system. In one embodiment, the user data store 112 does not store a user's contacts. Instead, a user's contacts are stored locally on the user's client device 140 and the chat server 110 (where included) receives a phone number or other device identifier as part of a request to initiate a chat session. Thus, contact information need not be stored by the chat server 110, protecting user privacy.

In another embodiment, the user data store 112 provides a contacts list in which a user can look up another user and request initiation of a chat session. In response, the user data store 112 provides the information required to initiate the chat session (e.g., a phone number or device ID corresponding to the other user). Thus, the user's client device 140 can establish a chat session directly with the other user's client device using a P2P protocol.

In embodiments where chat sessions are mediated by the chat server, the packet forwarding module 114 receives packets sent by a sending client device 140 as part of a chat session and forwards them to the appropriate receiving client device or devices. In one embodiment, the packet forwarding module 114 maintains a list of active chat sessions (e.g., in the user data store 112) along with identifying information for the client devices 140 involved in each session (e.g., phone numbers, device IDs, or the like). Chat sessions can be identified by a separate chat identifier (e.g., a unique chat ID number) or the identifying information of the client devices 140 involved in the session. For example, if client devices 140 are limited to being in one chat session at a time, then the identity of any of the client devices 140 engaged in a chat session uniquely identifies the chat session among all current chat session. Regardless of the specific identification method used, the packet forwarding module 114 forwards a received packet based on identifying information provided with the packet (e.g., a chat session ID number, a phone number of the sending device, a device ID of the sending device, or the like).

The network 170 provides the communication channels via which the other elements of the system environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
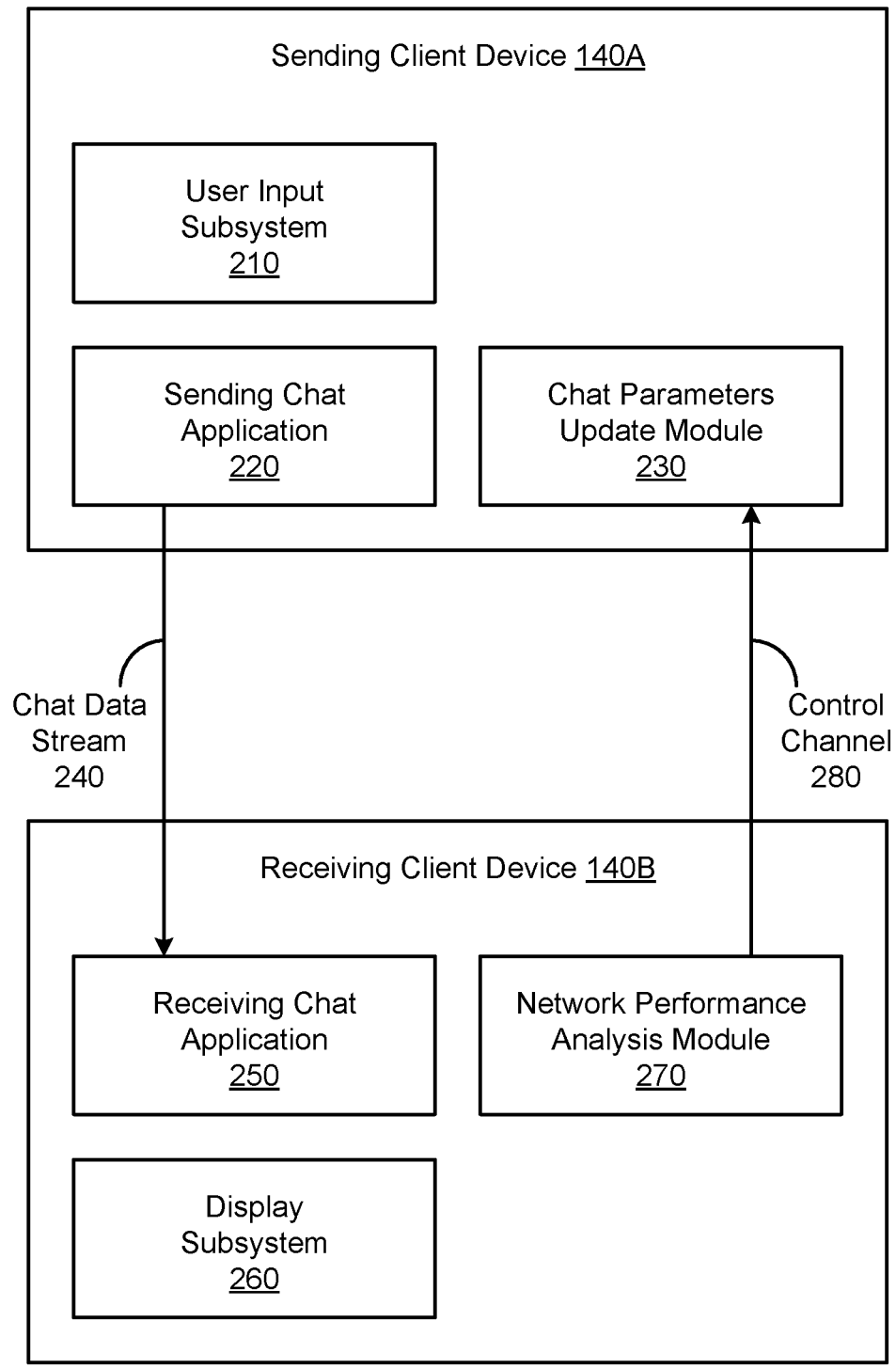
FIG. 2 is a high-level block diagram illustrating a pair of client devices engaged in a chat session, according to one embodiment.

FIG. 2 shows a pair of client devices 140A and 140B engaged in a chat session, according to one embodiment. In the embodiment shown in FIG. 2, there is a sending client device 140A and a receiving client device 140B. As noted above, in typical chat sessions, both client devices 140 will act as a sending client device 140A and as a receiving client device 140B. For example, when engaged in an audio call, both client devices 140 obtain audio data using a microphone and send it over the network 170 to the other client device. In embodiments where more than two client devices 140 can be involved in a chat session, each can act both as a sending client device 140A and a receiving client device 140B. For example, in a video conference, all of the client devices 140 might collect video data with a video camera and audio data with a microphone, and send that data to each of the other client devices engaged in the video conference.

The sending client device 140A transmits chat data to the receiving client device 140B in a chat data stream 240. The chat data stream 240 is a data connection between the two client devices 140. As noted previously, the chat data stream can pass through a chat server 110 (e.g., via the network 170) or be a P2P connection. Other methods of establishing a data connection between the client devices 140 may also be used.

The receiving client device 140B sends control data to the sending client device 140A through a control channel 280. The control channel 280 is a data connection between the two client devices and, like the chat data stream 240, may be P2p or via the chat server 110. In embodiments where a client device 140 is acting as both a sending client device 140A and a receiving client device 140B, the control channel 280 can be part of the outgoing chat data stream 240. For example, control data might be included in the headers of packets sent through the chat data stream 240.

In the embodiment shown in FIG. 2, the sending client device 140A includes a user input subsystem 210, a sending chat application 220, and a chat parameters update module 230. The receiving client device 140B includes a receiving chat application 250, a display subsystem 260, and a network performance analysis module 270. In other embodiments, the sending client device 140A and/or receiving client device 140B contain different and/or additional elements. In addition, the functions may be distributed among the elements in a different manner than described.

The user input subsystem 210 enables a user to provide content for inclusion in a chat session. The user input subsystem 210 receives user input in one or more forms and generates content data. In various embodiments, the user input subsystem 210 includes one or more of: a video camera, a microphone, a keyboard (physical or on-screen), and a pointing device (physical or on-screen). The video camera creates video data and the microphone creates audio data. The keyboard can be used to input text messages for inclusion in the chat and may also be used in conjunction with the pointing device to select files to add to the chat session (e.g., documents to send to the other participant or participants in the chat session). Thus, the content data can include one or more types of content.

The sending chat application establishes and maintains the chat (e.g., VOIP) data stream 240 with the receiving chat application 250. In various embodiments, the sending chat application 220 receives the content data from the user input subsystem 210 and divides the data into segments. In one embodiment, the segments are all of equal length. In other embodiments, other methods may be used to determine how to divide the content into segments. However they are derived, these segments are then packaged into a set of sequential packets, with the sequence number of each packet included as metadata (e.g., in a packet header). The packets are then added to the chat data stream 240 in sequential order (as indicated by the packet headers).

Figure 3:
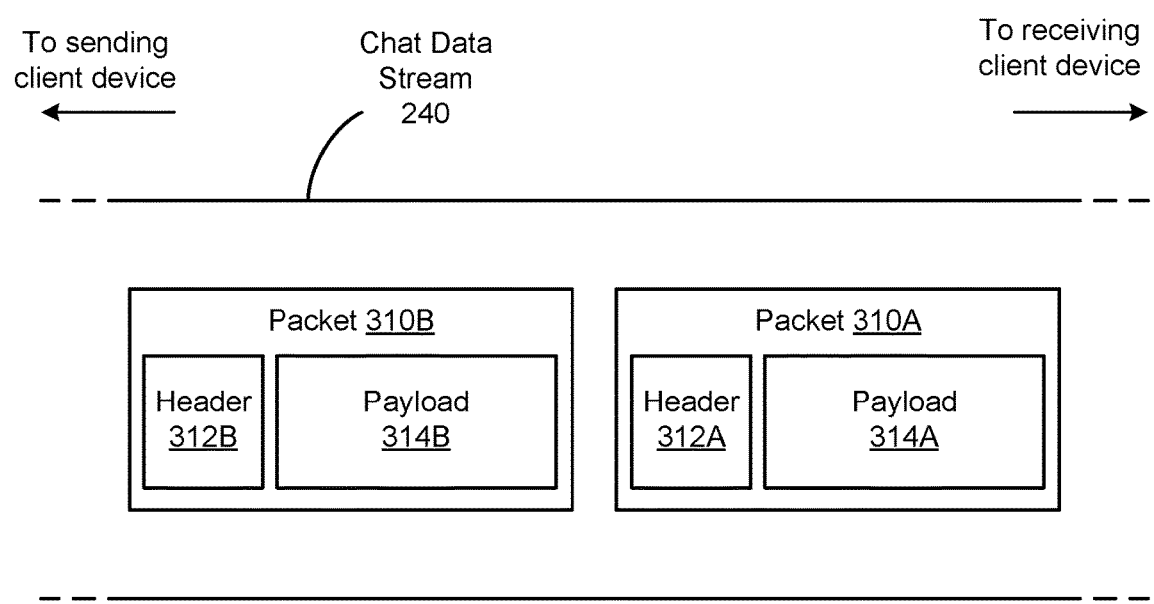
FIG. 3 is a high-level block diagram illustrating packets in a chat data stream, according to one embodiment.

FIG. 3 in a conceptual illustration of a portion of the chat data stream 240, according to one embodiment. The portion of the chat data stream 240 shown in FIG. 3 includes a first packet 310A and a second packet 310B. Two packets 310 are shown in FIG. 3 for illustrative purpose, but a full chat data stream 240 will typically include many more packets. The first packet 310A was sent before the second packet 310B and thus is closer to the receiving client device 140B than the second packet 310B in the chat data stream 240. Conversely, the second packet 310B is closer to the sending client device 140A than the first packet 310A. Note that this is only illustrative. In practice, packets can change order during transit and the receiving client device 140A restores the correct order based on the packet numbers. In other embodiments, the packets 310 may include additional elements.

In the embodiment shown in FIG. 3, the first packet 310A includes a header 312A and a payload 314A. The header 312A includes the sequence number of the packet in chat session. It may also include additional identifying information, such as an identifier of the chat session (e.g., a session ID number) and identifiers of the sending and receiving devices (e.g., phone numbers, device IDS, etc.). The payload 314A includes the segment of the chat content that is included in the first packet 310A.

Similarly, the second packet 310B includes a header 312B and a payload 314B. The packet number in the header 312B is the next sequential number in whatever predetermined pattern is being used to number the packets (assuming there have not already been packets lost and the first packet 210A and the second packet 310B have not been reordered in transit). For example, if a consecutive numbering scheme is used, and the first packet's header 312A included the packet number 42, then the second packet's header 312B would include the packet number 43. The payload 314B of the second packet 310B includes the segment of the chat content that immediately follows the segment included in the first packet's payload 314A.

Referring back to FIG. 2, the chat data stream 240 is received by the chat application 250 of the receiving client device 140B. In the embodiment shown in FIG. 2, the receiving chat application decodes the chat data stream 240 to reproduce the content data. The content data is passed to the display subsystem 260, which presents the content to a user. For example, if the content data is video data, the display subsystem 260 uses that data to reproduce the original images captured by the camera of the sending client device 140A. In a perfect situation, all of the content data will be successfully received by the receiving client device 140B, and the original content will be reproduced perfectly.

However, in practice, some packets will be lost in transit through the chat data stream 240, reducing the quality of reproduction of the content.

To reduce the amount of packet loss, and thus improve the quality of content reproduction, the packets received in the chat data stream 240 are also passed to the network performance analysis module 270. As noted previously, causes of packet loss include network congestion and link loss. Where the loss is due to congestion, the problem can be addressed by reducing the amount of data being added to the chat data stream 240 (e.g., by reducing the bitrate of a video chat). Conversely, link losses can be addressed by sending redundant error-correction packets to increase the chances that data packets will be received or recovered, which increases the amount of data added to the chat data stream 240.

In various embodiments, the network performance analysis module 270 extracts signals from received packets to determine whether there is a significant amount of packet loss and, if so, whether it was caused by congestion or link losses. In one embodiment, the amount of packet loss is considered significant if the number of packets lost in a given time period exceeds a packet loss threshold. For example, the packet loss threshold might be set at 2%. In this case, the network performance analysis module 270 determines the expected number of packets for the time period based on the packet numbers and if more than 2% of the expected packets are missing, the packet loss is considered significant. If delivery of all packets is considered important, even a single packet loss may be considered significant.

The network performance analysis module 270 analyzes the extracted signals to determine what corrective action (if any) should be taken and sends a control message back to the sending client device 140A over a control channel 280. The control message can be very short, such as a single bit indicating the state of a given signal, or a few bits indicating how the sending client device 140A should change the chat data stream 240 (e.g., instructions to change the bit rate, provide more redundant packets, etc.). In other words, a control message can indicate how a parameter of the chat session should be updated either directly, by indicating the desired change, or indirectly, by identifying the problem (in which case, the receiving client device 140B determines what corrective action to take, if any). Examples of the signals and how they are interpreted are provided below, with reference to FIGS. 5 through 8.

In one embodiment, the network performance analysis module 270 extracts the signals and sends control messages in a substantially continuous loop throughout the lifetime of the chat session, beginning the next cycle as soon as the previous cycle completes. In another embodiment, the network performance analysis module 270 extracts the signals and sends control messages at fixed intervals (e.g., after a specified amount of new packets are received, every second, etc.). One of skill in the art will recognize various ways in which the process can be repeated to generate regular control messages based on the current network conditions.

The sending client device 140A receives the control messages and updates the parameters of the chat session accordingly. In one embodiment, the chat parameters update module 230 receives a control message and determines how the parameters of the chat session should be updated. For example, if the control message indicates the extracted signals are consistent with network congestion, then the chat parameters update module 230 might lower the bit rate of any audio or video content being generated by the user input subsystem 210. Conversely, if the control message indicates a high level of link losses, the chat parameters update module 230 might instruct the sending chat application 220 to start sending packets with redundant payloads. In another embodiment, the network performance analysis module 270 generates specific instructions regarding what changes should be made to the chat session and the chat parameters update module 230 just directs these instructions to the appropriate element of the sending client device 140A.

Figure 4:
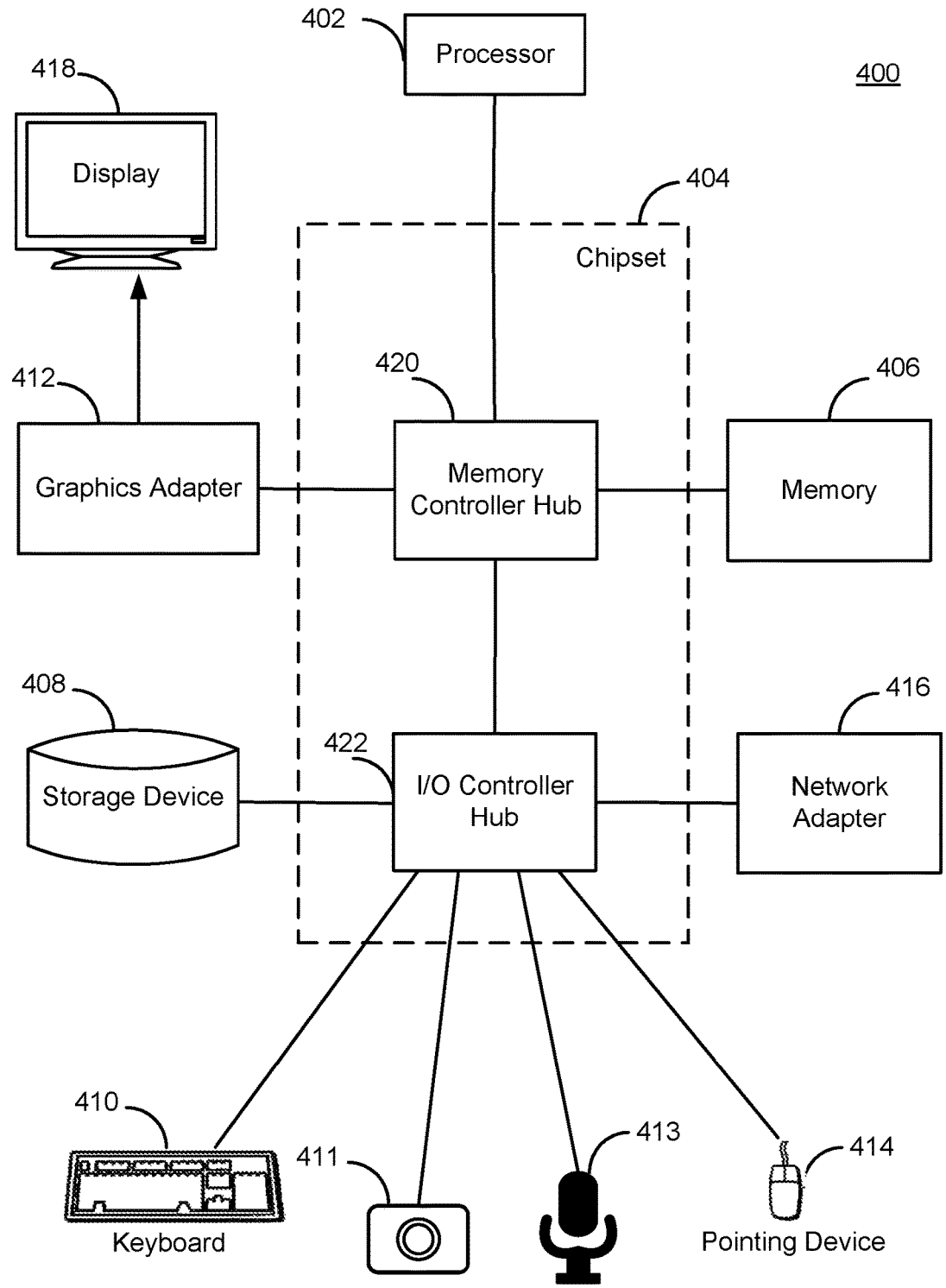
FIG. 4 is a high-level block diagram illustrating an example of a computer suitable for use in the system environment of FIG. 1, according to one embodiment.

FIG. 4 is a high-level block diagram illustrating an example computer 400 suitable for use as a client device 140 or chat server 110. The example computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, video camera 411, microphone 413, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, touch-screen, or other type of pointing device, and is used in combination with the keyboard 410 (which may be an on-screen keyboard) to input data into the computer system 400. The microphone 413 and video camera 411 can be used to provide audio and visual input, respectively. The graphics adapter 412 displays images and other information on the display 418. The network adapter 416 couples the computer system 400 to one or more computer networks, such as network 170.

The types of computers used by the entities of FIGS. 1 and 2 can vary depending upon the embodiment and the processing power required by the entity. For example, the chat server 110 might include a distributed database system comprising multiple blade servers working together to provide the functionality described. Furthermore, the computers can lack some of the components described above, such as keyboards 410, graphics adapters 412, and displays 418.

Example Methods for Managing the Parameters of a Chat Session

Figure 5:
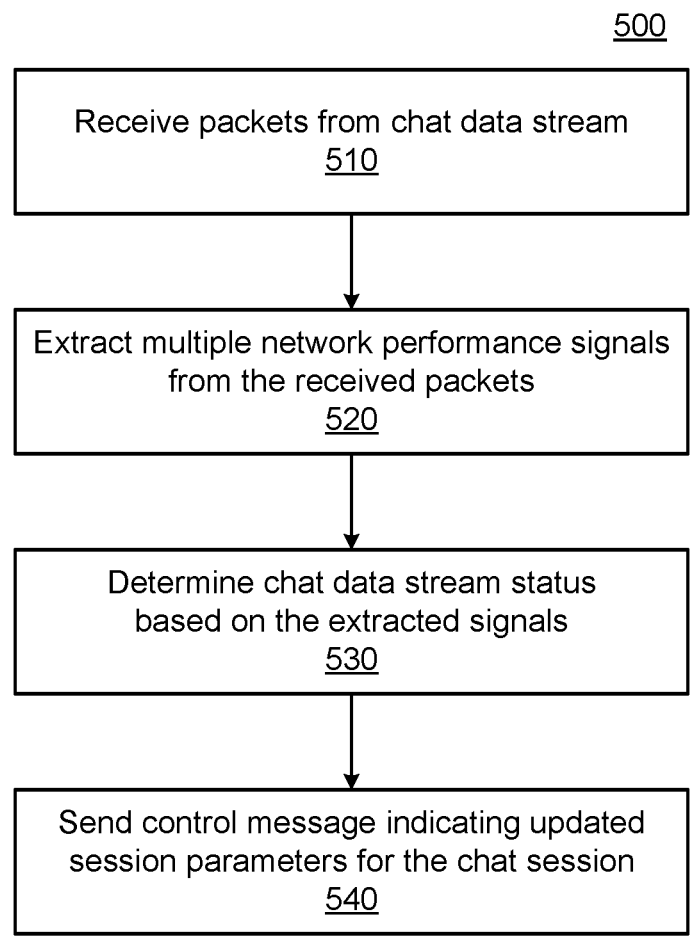
FIG. 5 is a flow-chart illustrating a method for managing the parameters of a chat session, according to one embodiment.

FIG. 5 illustrates one embodiment of a method 500 for managing the parameters of a chat session. The steps of FIG. 5 are illustrated from the perspective of the network performance analysis module 270 performing the method 500. However, some or all of the steps may be performed by other entities or components. In addition, some embodiments may perform the steps in parallel, perform the steps in different orders, or perform different steps.

In the embodiment shown in FIG. 5, the method 500 begins with the network performance analysis module 270 receiving 510 packets from the chat data stream 240. A chat session will typically involve a constant or nearly constant stream of packets being received over the network 170. Packets that relate to the chat session can be identified from the packet headers (e.g., using a chat session ID, an identifier of the sending client device 140A, or the like). In one embodiment, the chat session packets are provided to the network performance analysis module 270 as they are received 510. In other embodiments, the received packets are buffered and provided to the network performance analysis module 270 in groups (e.g., blocks of 10 packets, 25 packets, 100 packets, etc.).

The network performance analysis module 270 extracts 520 multiple network performance signals from the received packets. The signals provide an indication of the severity and distribution of packet loss (e.g., the number of packets lost and whether the lost packets form large consecutive blocks or are mostly randomly distributed). The network performance analysis module 270 can extract 520 the signals from the currently received packets alone, from a combination of those packets and previously received packets that relate to the same chat session, or using a mix of both approaches. In one embodiment, the signals are determined from factors such as: the number of lost packets, the distribution of lost packets, the ROTT of the packets (the difference between the timestamp of the packet and the time of receipt indicated by the receiving client device's clock), and the like. Examples of extracted signals are described in greater detail below, with reference to FIGS. 6 through 8.

The network performance analysis module 270 determines 530 the status of the chat data stream 240 based on the extracted signals. In one embodiment, the status of the chat data stream 240 includes two components: an overall severity of packet loss (e.g., the proportion of packets being lost) and the primary cause of packet loss. The primary cause of packet loss can be the one that the signals indicate is causing the greatest number of packets to be lost. However, in some cases, the determination can be skewed to favor finding one cause to be the primary cause over the other. For example, the primary cause might be considered to be network congestion unless the signals indicate a certain proportion (e.g., 60%) of the lost packets are link losses. In another embodiment, if any one of the signals indicates a significant amount of network congestion, the primary cause is considered to be network congestion.

The network performance analysis module 270 then sends 540 a control message to the sending client device 140A indicating updated chat session parameters. The updated parameters are based on the status of the chat data stream. In one embodiment, there are four possible scenarios: (1) the amount of packet loss is above the packet loss threshold and the losses are primarily due to network congestion; (2) the amount of packet loss is above the packet loss threshold and the losses are primarily link losses; (3) the amount of packet loss is below the packet loss threshold and the losses are primarily due to network congestion; and (4) the amount of packet loss is below the packet loss threshold and the losses are primarily link losses.

In the first scenario, the packet loss is considered significant and the primary cause is network congestion. Therefore, the control message might indicate that the sending client device 140A should reduce the bit rate of the chat. This will reduce the total amount of data sent, thus alleviating the congestion. Alternatively or additionally, if the signals indicate that there are not many link losses, the control message might indicate that packet redundancy can be reduced. This would also reduce the total amount of data sent.

In the second scenario, the packet loss is also considered significant, but the primary cause is link losses. Therefore, the control message might indicate that packet redundancy should be increased. This increases the number of instances of each packet that are added to the chat data stream 240, reducing the likelihood that no instance of any given packet will be successfully received. The control message might also indicate that the bit rate of the chat should be reduced to preemptively free up network bandwidth for the increase in traffic that will result from the increased packet redundancy.

In the third scenario, the amount of packet loss is not considered significant, and to the extent it is present, it is primarily due to network congestion. Therefore, the control message might indicate that packet redundancy can be reduced. This will reduce the number of packets being sent, alleviating the small amount of network congestion that is present. The control signal might also indicate that the bitrate can be increased to make use of the additional network bandwidth being made available by the reduced redundancy.

In the fourth scenario, the amount of packet loss is not considered significant, and to the extent it is present, it is primarily due to link losses. Therefore, the control message might indicate that the bitrate of the chat session can be increased because it appears that there is additional network bandwidth available. The control message might also indicate that packet redundancy can be reduced, because link losses are present, but not currently a problem. This will reduce the likelihood that the increased bitrate will lead to network congestion.

In another embodiment, the network performance analysis module 270 does not determine 530 the status of the chat stream and the control message just indicates the status of the signals. The analysis of the signals and determination as to what changes should be made to the chat session parameters (if any) is then made by the sending client device 140A based on the received status of the signals.

Figure 6:
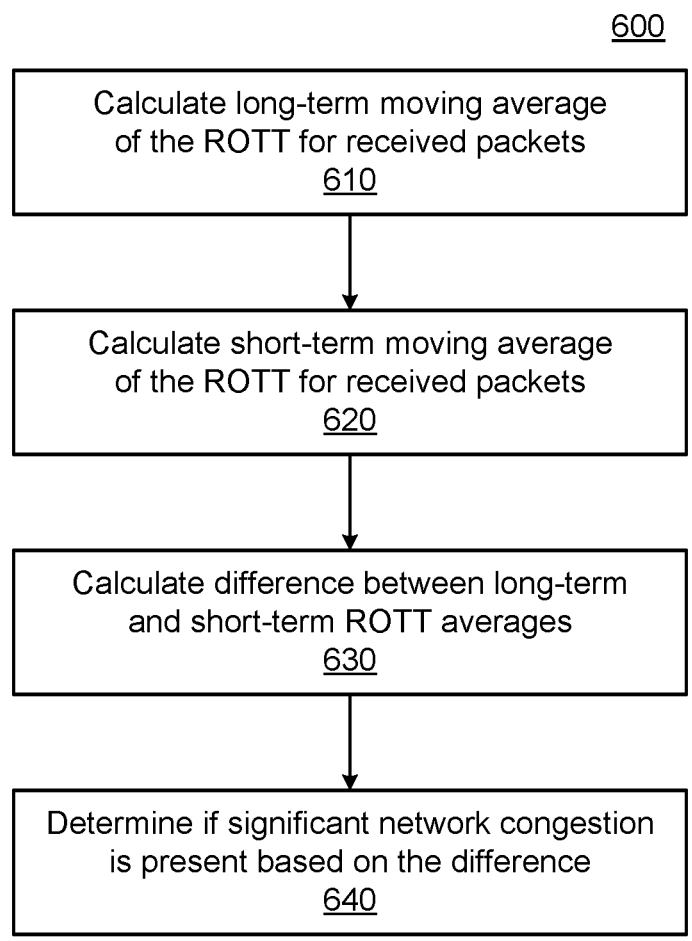
FIG. 6 is a flow-chart illustrating a method for detecting network congestion using a moving average signal, according to one embodiment.

FIG. 6 illustrates one embodiment of a method 600 for detecting network congestion using a moving average signal. The steps of FIG. 6 are illustrated from the perspective of the network performance analysis module 270 performing the method 600. However, some or all of the steps may be performed by other entities or components. In addition, some embodiments may perform the steps in parallel, perform the steps in different orders, or perform different steps.

In the embodiment shown in FIG. 6, the method 600 begins by calculating 610 the long-term moving average of the ROTT for the received packets. The long-term average is calculated 610 using a relatively large number of packets (e.g., the last 100 received packets). Because of this, it changes relatively slowly in response to variations in network conditions. Consequently, it can represent a baseline of what is a normal ROTT for the network path between the two client devices 140A and 140B.

The network performance analysis module 270 also calculates 620 a short-term moving average of the ROTT for received packets. The short-term average is calculated 620 using less packets than the long-term average (e.g., the last 25 received packets). As a result, the short-term average changes relatively quickly in response to variations in network conditions. Consequently, the short-term average is representative of the current condition of the network path between the two client devices 140A and 140B. The short-term average could be calculated 620 based on a single packet (i.e., by just taking the ROTT of each packet received as a new short-term average). However, using the average of a small group (relative to the long-term average) may smooth out fluctuations due to noise, encoder processing needs, and other factors not indicative of network congestion.

The network performance analysis module 270 calculates 630 the difference between the long-term and short-term ROTT averages. This difference is an approximation of the difference between normal ROTT for the network connection (represented by the long-term average) and the current ROTT (represented by the short-term average). In other embodiments, the difference is calculated 630 as a relative value, rather than an absolute value, such as by calculating a ratio of the averages.

Based on the difference, the network performance analysis module 270 determines 640 whether there is currently a significant amount of network congestion. If the network 170 is congested, the ROTT of packets will be greater than when the network is uncongested due to the packets being delayed by one or more network bottlenecks. Consequently, an increase in ROTT (indicated by the short-term average being larger than the long-term average) indicates that the network 170 has changed from an uncongested to a congested state. In various embodiments, if the difference between the averages exceeds an ROTT average threshold, the network performance analysis module 270 determines 640 that the network is congested (e.g., that network congestion is significant). In one embodiment, the ROTT average threshold is set as a given percentage of the observed ROTT range (e.g., 10%). This can be calculated by subtracting the global minimum from the local maximum and multiplying by the desired percentage.

If the network performance analysis module 270 has previously determined the network 170 is congested, the determination 640 of network congestion is different. While the network is congested, the long-term average will gradually rise towards the short-term average. Thus, the network 170 becoming uncongested can be indicated by the short-term average dropping significantly relative to the long-term average. Additionally, if the long-term average gradually increases to match the short-term average, this suggests that the network 170 has stabilized on a different baseline (e.g., because one of the client devices 140 has moved from one wireless connection to another). In one embodiment, the network performance analysis module 270 determines that the network 170 has become uncongested when the short-term average drops below the long-term average. In other embodiments, other congestion end thresholds are used to determine when a period of network congestion has ended.

The moving average signal also provides a way to distinguish between packet loss due to network congestion and link losses. The result of a link loss is that a packet is lost and not received by the receiving client device 140B at all. Thus, a link loss has no impact on the ROTT averages. If a significant amount of packet loss is observed, but the short-term and long-term averages of ROTT remain substantially the same as each other, this indicates that the packet loss is primarily due to link losses not network congestion.

Figure 7:
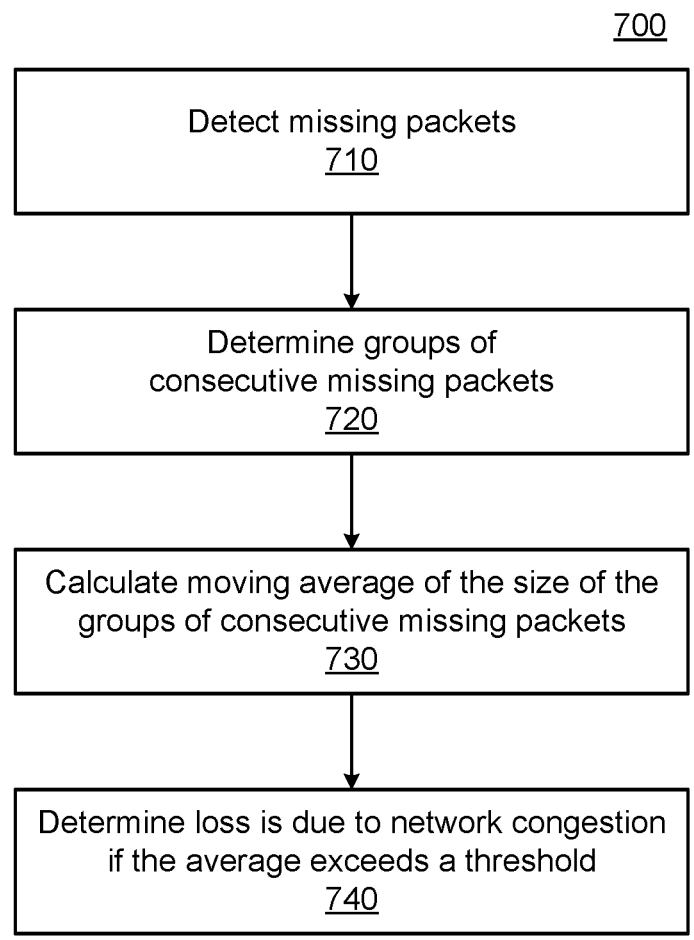
FIG. 7 is a flow-chart illustrating a method for distinguishing between network congestion and link losses using a packet loss gap signal, according to one embodiment.

FIG. 7 illustrates one embodiment of a method 700 for distinguishing between network congestion and link losses using a packet loss gap signal. The steps of FIG. 7 are illustrated from the perspective of the network performance analysis module 270 performing the method 700. However, some or all of the steps may be performed by other entities or components. In addition, some embodiments may perform the steps in parallel, perform the steps in different orders, or perform different steps.

In the embodiment shown in FIG. 7, the method 700 begins with the network performance analysis module 270 detecting 710 that packets are missing. As described above, the packets of a chat session are numbered using a predetermined scheme, so missing packets can be detected by looking for expected packet numbers that are not present in the received packets. For example, in the embodiment where packets are consecutively numbered, if the received packets are numbered 1, 3, 4, 5, 7, and 8, the network performance analysis module 270 can detect 710 that packets 2 and 6 are missing.

The network performance analysis module 270 determines 720 groups of consecutive packets that are missing. These missing groups are referred to as packet loss gaps. In the previous example, the network performance analysis module 270 would determine 720 that there are two packet loss gaps, each with a size of one, corresponding to packets 2 and 6). However, if packet 7 was also missing, there would still be two packet loss gaps, but one would have a size of two, corresponding to packets 6 and 7.

The network performance analysis module 270 calculates 730 the moving average of the packet loss gap size. The moving average can be over a predetermined number of packet loss gaps (e.g., the last ten detected), all the packet loss gaps from the current chat session, or some other subset of the packet loss gaps.

Based on the moving average, the network performance analysis module 270 determines 740 if the packet losses are primarily due to network congestion or link losses. Network congestion generally results in blocks of consecutive packets being lost when the buffer in a router becomes full and drops sets of newly received packets. Conversely, the distribution of link losses in the stream is substantially random, meaning the likelihood of two adjacent packets being dropped due to link loss is relatively small. Consequently, a large moving average of the packet loss gap size suggests the primary cause of packet loss is network congestion while a small moving average suggests link losses are the driving factor.

In one embodiment, the network performance analysis module 270 applies a packet loss gap threshold (e.g., 2.5) to determine 740 whether the primary cause of packet loss is network congestion or link losses. If the moving average exceeds the packet loss gap threshold, this indicates that the primary cause of packet loss is currently network congestion. In contrast, if the moving average is below the packet loss gap threshold, this suggests the primary cause of packet loss is link losses.

Figure 8:
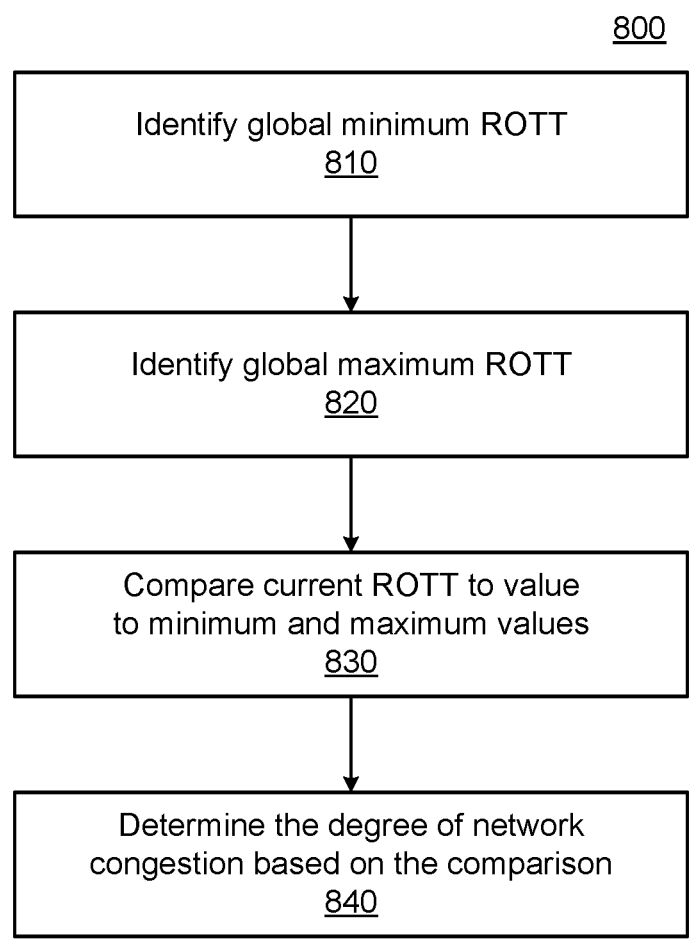
FIG. 8 is a flow-chart illustrating a method for determining the degree of network congestion using an overall latency signal, according to one embodiment.

FIG. 8 illustrates one embodiment of a method 800 for determining the degree of network congestion using an overall latency signal. The steps of FIG. 8 are illustrated from the perspective of the network performance analysis module 270 performing the method 800. However, some or all of the steps may be performed by other entities or components. In addition, some embodiments may perform the steps in parallel, perform the steps in different orders, or perform different steps.

In the embodiment shown in FIG. 8, the method 800 begins with the network performance analysis module 270 identifying 810 the global minimum ROTT. In one embodiment, the global minimum is the shortest ROTT of any of the packets associated with the current chat session. In another embodiment, it is the shortest ROTT seen in a predetermined time period (e.g., the last minute, last thirty seconds, or the like). Similarly, it could be the shortest ROTT seen in a predetermined number of previous packets (e.g., the last 1,000 received).

The network performance analysis module 270 also identifies 820 the global maximum ROTT. In one embodiment, the global maximum is the longest ROTT of any of the packets associated with the current chat session. As with the global minimum, the value from a predetermined time period or number of packets may also be used.

The network performance analysis module 270 compares 830 the current ROTT value to the minimum and maximum values. The current value can be a moving average (e.g., the short-term average discussed above) or the value for a single packet that was recently received (e.g., the last packet received). In one embodiment, the comparison 830 includes calculating the percentile of the range between the minimum and maximum in which the current value falls. This can be achieved by subtracting the minimum from both the maximum and the current value to get updated current and maximum values, and then determining the percentage of the update current value relative to the updated maximum. For example, if the minimum were 10 ms and the maximum 110 ms, a current value of 60 ms would be 50% as it is exactly halfway between the minimum and maximum values.

The network performance analysis module 270 determines 840 the degree of network congestion based on the comparison 830. In one embodiment, the current value is used to classify the current network congestion for the chat data stream 240 as being in one of three states: a normal state, a caution state, and a congested state. The transitions between the states are defined by a pair of thresholds: a caution threshold between the normal and caution states and a danger threshold between the caution and congested states. For example, the caution threshold might be at 50%, so a current ROTT less than 50% means the chat data stream 240 is in the normal state, and the danger threshold might be at 75%, so a current ROTT between 50% and 75% corresponds to the caution state and a current ROTT over 75% corresponds to the congested state.

In another embodiment, the caution and danger thresholds are adjusted based on the value of the global maximum. If the global maximum exceeds a predetermined value, the thresholds are reduced to smaller percentages so that the congestion and caution areas are expanded (and the normal state is shrunk). This prevents a very high global max (e.g., due to a single package taking an unusually large amount of time to traverse the network) causing the current value to almost always be underneath the first threshold. If this occurred, the network performance analysis module 270 would almost always determine that the chat data stream 240 was in the normal state. Alternatively, the thresholds can be adjusted continuously (or in several discrete steps) based on the absolute difference between the global minimum and maximum. For example, the percentage value of each threshold could be set as a function of the difference between the global minimum and maximum such that the percentage value of each threshold drops as the difference increases.

Referring back to FIG. 5, in various embodiments, the determined degree of network congestion impacts the content of the control message sent 540 by the network performance analysis module 270. In particular, the degree of network congestion can be used to determine whether to modify the bitrate of chat session. In one embodiment, if the chat data stream 240 is in the normal states, the network performance analysis module 270 sends 540 a control message instructing the sending client device 140A to increase the bitrate. Conversely, if the chat data stream 240 is in the congested state, a control message is sent 540 instructing the sending client device 140A to reduce the bitrate of the chat session. If the chat data stream is in the caution state, the bit rate is left unchanged (either by sending 540 an explicit instruction to that effect or sending no instruction regarding bit rate). In another embodiment, the network performance analysis module 270 simply sends 540 a control message indicating the percentage value of the current ROTT and the sending client device 140A determines how the bit rate should be adjusted (e.g., using similar rules to those just described).

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
receiving packets from a sending client device via a network, wherein each of the received packets includes chat content data and metadata for a chat session, the metadata including a timestamp indicating when the received packet was sent;
determining one or more network performance signals from the metadata of the received packets, the one or more network performance signals distinguishing between a scenario where a network problem arises from congestion and a scenario where the network problem arises from link loss, wherein the one or more network performance signals include a moving average signal, determining the moving average signal comprising:
  calculating a relative one-way trip time (ROTT) for each received packet by comparing the timestamp to a time at which the received packet was received;
  calculating a long-term ROTT average, the long-term ROTT average being an average of the ROTT for the last n packets received, where n is a positive integer greater than one;
  calculating a short-term ROTT average, the short-term ROTT average being an average of the ROTT for the last m packets received, where m is a positive integer less than n; and
  calculating a difference between the long-term ROTT average and the short-term ROTT average, wherein the difference exceeding a threshold indicates the network problem arose from network congestion;
  selecting, based on the moving average signal, between attributing the network problem to network congestion and attributing the network problem to link loss;
  determining a control message to send based on whether the network problem is attributed to network congestion or link loss, the control message indicating how a parameter of the chat session should be updated to address the network problem, wherein, responsive to attributing the network problem to network congestion, the control message indicates that a bitrate of the chat session should be reduced; and
  sending the control message to the sending client device.

2. The method of claim 1, wherein, responsive to attributing the network problem to link loss, the control message indicates packet redundancy should be increased.

3. The method of claim 1, wherein determining the one or more network performance signals includes determining a packet loss gap signal, determining the packet loss gap signal comprising:
  determining one or more groups of missing packets; and
  calculating a moving average of the number of packets in the one or more groups, the moving average being below a threshold indicating the network problem arose due to link loss,
  wherein the moving average being below the threshold indicates that the network problem is due to link loss.

4. The method of claim 1, further comprising detecting the network problem, detecting the network problem including:
  determining a number of packets lost in a given time period; and
  determining the network problem is present responsive to the number of packets lost exceeding a packet loss threshold,
  wherein the control message is sent responsive to determining the network problem is present.

5. The method of claim 1, further comprising:
  receiving additional packets, wherein each of the additional received packets includes a corresponding timestamp indicating when the additional received packet was sent;
  calculating a relative one-way trip time (ROTT) for each additional received packet by comparing the corresponding timestamp to a time at which the additional received packet was received;
  calculating an updated long-term ROTT average, the updated long-term ROTT average being an average of the ROTT for the last n packets received, the last n packets received including the additional packets;
  calculating an updated short-term ROTT average, the updated short-term ROTT average being an average of the ROTT for the last m packets received, the last m packets received including the additional packets; and
  comparing the updated long-term ROTT average and the updated short-term ROTT average, wherein the updated short-term ROTT average being below the updated long-term ROTT average indicates the network has transitioned to an uncongested state.

6. The method of claim 1, wherein determining the one or more network performance signals includes determining an overall latency signal, determining the overall latency signal comprising:
  calculating a relative one-way trip time (ROTT) for each received packet by comparing the timestamp to a time at which the received packet was received;
  identifying a global minimum ROTT as a lowest ROTT of any of the received packets;
  identifying a global maximum ROTT as a highest ROTT of any of the received packets;
  calculating a current ROTT average, the current ROTT average being an average of the ROTT for the last n packets received, where n is a positive integer; and
  comparing the current ROTT average to a danger threshold between the global minimum and global maximum, wherein the current ROTT average exceeding the danger threshold indicates network congestion.

7. The method of claim 6, further comprising setting the danger threshold at a given percentage of a range between the global minimum and the global maximum, and wherein, responsive to the current ROTT average being above the danger threshold, the control message includes an indication that the bitrate of the chat session should be decreased.

8. The method of claim 6, wherein comparing the current ROTT average to the global minimum and global maximum comprises comparing the current ROTT average to a caution threshold between the danger threshold and the global minimum, and wherein, responsive to the current ROTT average being below the caution threshold, the control message includes an indication that the bitrate of the chat session can be increased.

9. A non-transitory computer-readable medium storing computer program instructions executable by a processor to perform operations comprising:
  receiving packets from a sending client device via a network, wherein each of the received packets includes chat content data and metadata for a chat session, the metadata including a timestamp indicating when the received packet was sent;
  determining one or more network performance signals from the metadata of the received packets, the one or more network performance signals distinguishing between a scenario where a network problem arises from congestion and a scenario where the network problem arises from link loss, wherein the one or more network performance signals include a moving average signal, determining the moving average signal comprising:
    calculating a relative one-way trip time (ROTT) for each received packet by comparing the timestamp to a time at which the received packet was received;
    calculating a long-term ROTT average, the long-term ROTT average being an average of the ROTT for the last n packets received, where n is a positive integer greater than one;

calculating a short-term ROTT average, the short-term ROTT average being an average of the ROTT for the last m packets received, where m is a positive integer less than n; and calculating a difference between the long-term ROTT average and the short-term ROTT average, wherein the difference exceeding a threshold indicates the network problem arose from network congestion;

selecting, based on the moving average signal, between attributing the network problem to network congestion and attributing the network problem to link loss;

determining a control message to send based on whether the network problem is attributed to network congestion or link loss, the control message indicating how a parameter of the chat session should be updated to address the network problem, wherein, responsive to attributing the network problem to network congestion, the control message indicates that a bitrate of the chat session should be reduced; and sending the control message to the sending client device.

10. The non-transitory computer-readable medium of claim 9, further comprising receiving additional packets from the sending client device, the additional packets including additional chat content data and additional metadata for the chat session, wherein the sending client device sent the additional packets after updating the parameter of the chat session based on the control message.

11. The non-transitory computer-readable medium of claim 9, wherein determining the one or more network performance signals includes determining a packet loss gap signal, determining the packet loss gap signal comprising:
determining one or more groups of missing packets; and
calculating a moving average of the number of packets in the one or more groups, the moving average being below a threshold indicating the network problem arose due to link loss,
wherein the moving average being below the threshold indicates that the network problem is due to link loss.

12. The non-transitory computer-readable medium of claim 9, wherein the operations further comprise detecting the network problem, detecting the network problem including:
determining a number of packets lost in a given time period; and
determining the network problem is present responsive to the number of packets lost exceeding a packet loss threshold,
wherein the control message is sent responsive to determining the network problem is present.

13. The non-transitory computer-readable medium of claim 12, wherein the computer-readable storage medium further contains computer program instructions for:
receiving additional packets, each of the additional received packets including a corresponding timestamp indicating when the additional received packet was sent;
calculating a relative one-way trip time (ROTT) for each additional received packet by comparing the corresponding timestamp to a time at which the additional received packet was received;
calculating an updated long-term ROTT average, the updated long-term ROTT average being an average of the ROTT for the last n packets received, the last n packets received including the additional packets;
calculating an updated short-term ROTT average, the updated short-term ROTT average being an average of the ROTT for the last m packets received, the last m packets received including the additional packets; and
comparing the updated long-term ROTT average and the updated short-term ROTT average, wherein the updated short-term ROTT average being below the updated long-term ROTT average indicates the network has transitioned to an uncongested state.

14. The non-transitory computer-readable medium of claim 9, wherein determining the one or more network performance signals includes determining an overall latency signal, determining the overall latency signal comprising:
calculating a relative one-way trip time (ROTT) for each received packet by comparing the timestamp to a time at which the received packet was received;
identifying a global minimum ROTT as a lowest ROTT of any of the received packets;
identifying a global maximum ROTT as a highest ROTT of any of the received packets;
calculating a current ROTT average, the current ROTT average being an average of the ROTT for the last n packets received, where n is a positive integer; and
comparing the current ROTT average to a danger threshold between the global minimum and global maximum, wherein the current ROTT average exceeding the danger threshold indicates network congestion.

15. The non-transitory computer-readable medium of claim 14, wherein the operations further comprise setting the danger threshold at a given percentage of a range between the global minimum and the global maximum, and wherein, responsive to the current ROTT average being above the danger threshold, the control message includes an indication that the bitrate of the chat session should be decreased.

16. The non-transitory computer-readable medium of claim 14, wherein comparing the current ROTT average to the global minimum and global maximum comprises comparing the current ROTT average to a caution threshold between the danger threshold and the global minimum, and wherein, responsive to the current ROTT average being below the caution threshold, the control message includes an indication that the bitrate of the chat session can be increased.

17. A computer system comprising:
one or more processors; and
one or more computer readable media storing computer program instructions that, when executed, cause the one or more processors to perform operations including:
receiving packets from a sending client device via a network, wherein each of the received packets includes chat content data and metadata for a chat session, the metadata including a timestamp indicating when the received packet was sent;
determining one or more network performance signals from the metadata of the received packets, the one or more network performance signals distinguishing between a scenario where a network problem arises from congestion and a scenario where the network problem arises from link loss, wherein the one or more network performance signals include a moving average signal, determining the moving average signal comprising:
calculating a relative one-way trip time (ROTT) for each received packet by comparing the timestamp to a time at which the received packet was received;
calculating a long-term ROTT average, the long-term ROTT average being an average of the ROTT for the last n packets received, where n is a positive integer greater than one;

calculating a short-term ROTT average, the short-term ROTT average being an average of the ROTT for the last m packets received, where m is a positive integer less than n; and calculating a difference between the long-term ROTT average and the short-term ROTT average, wherein the difference exceeding a threshold indicates the network problem arose from network congestion;

selecting, based on the moving average signal, between attributing the network problem to network congestion and attributing the network problem to link loss;

determining a control message to send based on whether the network problem is attributed to network congestion or link loss, the control message indicating how a parameter of the chat session should be updated to address the network problem, wherein, responsive to attributing the network problem to network congestion, the control message indicates that a bitrate of the chat session should be reduced; and sending the control message to the sending client device.

18. The computer system of claim 17, wherein determining the one or more network performance signals includes determining a packet loss gap signal, determining the packet loss gap signal comprising:

determining one or more groups of missing packets; and calculating a moving average of the number of packets in the one or more groups, the moving average being below a threshold indicating the network problem arose due to link loss, wherein, the moving average being below the threshold indicates that the network problem is due to link loss.

19. The computer system of claim 17, wherein the operations further include detecting the network problem, detecting the network problem including:

determining a number of packets lost in a given time period; and determining the network problem is present responsive to the number of packets lost exceeding a packet loss threshold, wherein the control message is sent responsive to determining the network problem is present.

20. The computer system of claim 17, wherein determining the one or more network performance signals includes determining an overall latency signal, determining the overall latency signal comprising:

calculating a relative one-way trip time (ROTT) for each received packet by comparing the timestamp to a time at which the received packet was received;

identifying a global minimum ROTT as a lowest ROTT of any of the received packets;

identifying a global maximum ROTT as a highest ROTT of any of the received packets;

calculating a current ROTT average, the current ROTT average being an average of the ROTT for the last n packets received, where n is a positive integer; and comparing the current ROTT average to the global minimum and global maximum, the comparing comprising:

comparing the current ROTT average to a caution threshold between the global minimum and the global maximum, wherein the control message includes an indication that the bitrate of the chat session should be increased responsive to the current ROTT average being below the caution threshold; and comparing the current ROTT average to a warning threshold between the caution threshold and the global maximum, and wherein, responsive to the current ROTT average being above the warning threshold, the control message includes an indication that the bitrate of the chat session should be decreased.

* * * * *